US012753704B2

(12) United States Patent
Rousselle et al.

(10) Patent No.: US 12,753,704 B2
(45) Date of Patent: Oct. 6, 2026

(54) METHOD FOR PRODUCING AN ABRADABLE COATING, ABRADABLE COATING AND COATED PART

(71) Applicants: SAFRAN AIRCRAFT ENGINES, Paris (FR); CENTRE NATIONAL DE LA RECHERCHE SCIENTIFIQUE, Paris (FR); UNIVERSITE PAUL SABATIER TOULOUSE III, Toulouse Cedex (FR)

(72) Inventors: Mélanie Laura Josépha Rousselle, Moissy-Cramayel (FR); Guillaume Fradet, Moissy-Cramayel (FR); Claude Gilbert Jean-Pierre Estournes, Rieumes (FR); Florence Ansart, Labège (FR); Thomas Herisson De Beauvoir, Toulouse Cedex (FR)

(73) Assignees: SAFRAN AIRCRAFT ENGINES, Paris (FR); CENTRE NATIONAL DE LA RECHERCHE SCIENTIFIQUE, Paris (FR); UNIVERSITE PAUL SABATIER TOULOUSE III, Toulouse Cedex (FR)

( * ) Notice: Subject to any disclaimer, the term of this patent is extended or adjusted under 35 U.S.C. 154(b) by 0 days.

(21) Appl. No.: 19/110,704

(22) PCT Filed: Sep. 4, 2023

(86) PCT No.: PCT/FR2023/051325

§ 371 (c)(1),
(2) Date: Mar. 11, 2025

(87) PCT Pub. No.: WO2024/056958

PCT Pub. Date: Mar. 21, 2024

(65) Prior Publication Data

US 2026/0092532 A1 Apr. 2, 2026

(30) Foreign Application Priority Data

Sep. 13, 2022 (FR) ........................................ 2209198

(51) Int. Cl.

| | |
|---|---|
| ***F01D 11/12*** | (2006.01) |
| ***C23C 24/08*** | (2006.01) |
| ***F01D 25/00*** | (2006.01) |

(52) U.S. Cl.

CPC .......... *F01D 11/122* (2013.01); *C23C 24/082* (2013.01); *F01D 25/005* (2013.01);
(Continued)

(58) Field of Classification Search

CPC ... F01D 25/005; F01D 11/122; C23C 24/082; F05D 2230/90; F05D 2230/175; F05D 2230/2118; F05D 2230/506

See application file for complete search history.

(56) References Cited

U.S. PATENT DOCUMENTS

2013/0177740 A1* 7/2013 Merrill .................... B22F 5/009 427/535
2015/0211382 A1* 7/2015 Podgorski ................ C23D 5/10 427/193

(Continued)

FOREIGN PATENT DOCUMENTS

FR 3044945 A1 * 6/2017 ................ B22F 7/08
FR 3082765 A1 12/2019
WO WO-2017158265 A1 * 9/2017 ............. B22F 7/008

OTHER PUBLICATIONS

C. Elissalde et al., Single-step sintering of zirconia ceramics using hydroxide precursors and Spark Plasma Sintering below 400C, Scripta Materialia, vol. 168, 2019, pp. 134-138 (Year: 2019).*

(Continued)

*Primary Examiner* — Ryan C Clark

(74) *Attorney, Agent, or Firm* — Bookoff Mc Andrews, PLLC

(57) ABSTRACT

A method for producing an abradable ceramic composite coating on a substrate, the method including: obtaining a pulverulent composition including a matrix powder and a ceramic filler hydrated precursor powder having a lamellar crystallographic structure, wherein the ceramic filler powder represents from 5 to 40% of the combined volume of the (Continued)

2A matrix powder and the ceramic filler powder, compressing the prepared pulverulent composition at a pressure greater than 150 MPa, and a step of reactive sintering the obtained pulverulent composition, during which the compression is maintained, at a temperature of less than 550° C., and the particles of the matrix powder in the sintered pulverulent composition have an aspect ratio of 2 or greater.

14 Claims, 5 Drawing Sheets

(52) U.S. Cl.
CPC .... *F05D 2230/90* (2013.01); *F05D 2300/175* (2013.01); *F05D 2300/2118* (2013.01); *F05D 2300/506* (2013.01)

(56) References Cited

U.S. PATENT DOCUMENTS

| | | | | |
|---|---|---|---|---|
| 2017/0088471 | A1* | 3/2017 | Randall | C04B 35/6264 |
| 2021/0172331 | A1* | 6/2021 | Le Biez | F01D 11/122 |
| 2021/0317584 | A1* | 10/2021 | Selezneff | C04B 41/0018 |

OTHER PUBLICATIONS

Rousselle et al., "Phase evolution and sinterability of Lanthanum phosphate—Towards a below 600C Spark Plasma Sintering", Journal of the European Ceramic Society, vol. 41, Issue 14, 2021, pp. 7261-7268 (Year: 2021).*
Zhao Meng et al., "Properties of Yttria-Stabilized-Zirconia Based Ceramic Composite Abradable Coatings." Key Engineering Materials 512-515, 2012, pp. 1551-1554 (Year: 2012).*
C. Elissalde, U-C. Chung, M. Josse, G. Goglio, M.R. Suchomel, J. Majimel, A. Weibel, F. Soubie, A. Flaureau, A. Fregeac, C. Estournés, Single-step sintering of zirconia ceramics using hydroxide precursors and Spark Plasma Sintering below 400° C., Scripta Materialia, vol. 168, 2019, pp. 134-138, ISSN 1359-6462, https://doi.org/10.1016/j.scriptamat.2019.04.037. https://www.sciencedirect.com/science/article/pii/S1359646219302489).
Melanie Rousselle, Florence Ansart, Thomas Herisson de Beauvoir, Guillaume Fradet, Claude Estournés, Phase evolution and sinterability of lanthanum phosphate—Towards a below 600 Spark Plasma Sintering, Journal of the European Ceramic Society, vol. 41, Issue 14, 2021, pp. 7261-7268, ISSN 0955-2219, https://doi.org/10.1016/j.jeurceramsoc.2021.07.014.
Search Report and Written Opinion issued in International Application No. PCT/FR2023/051325, mailed Dec. 12, 2023.
Zhao, Mengqiang et al. "Properties of Yttria-Stabilized-Zirconia Based Ceramic Composite Abradable Coatings." Key Engineering Materials 512-515 (2012): 1551-1554.

* cited by examiner

[Fig. 1]
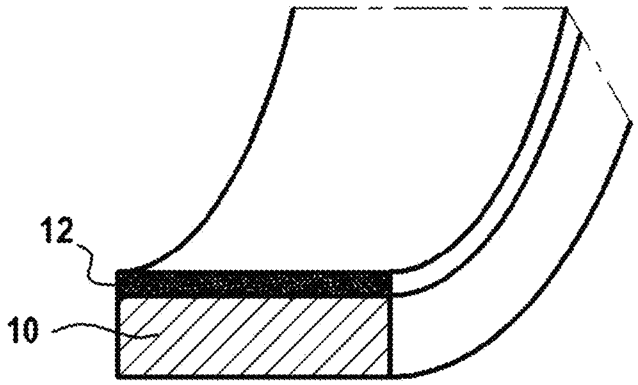
[Fig. 2A]
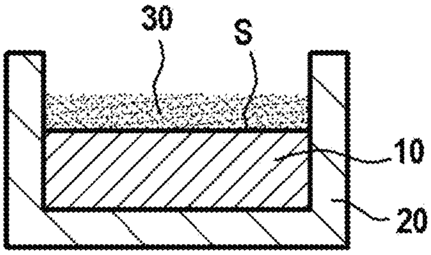
2A
[Fig. 2B]
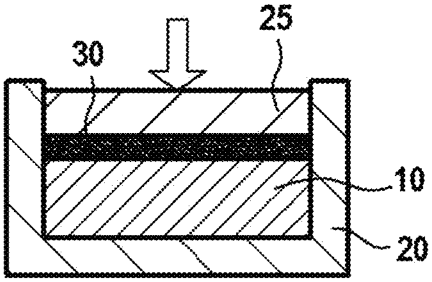
2B
[Fig. 3]
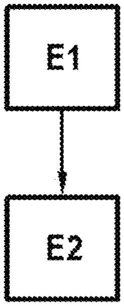

[Fig. 4A]
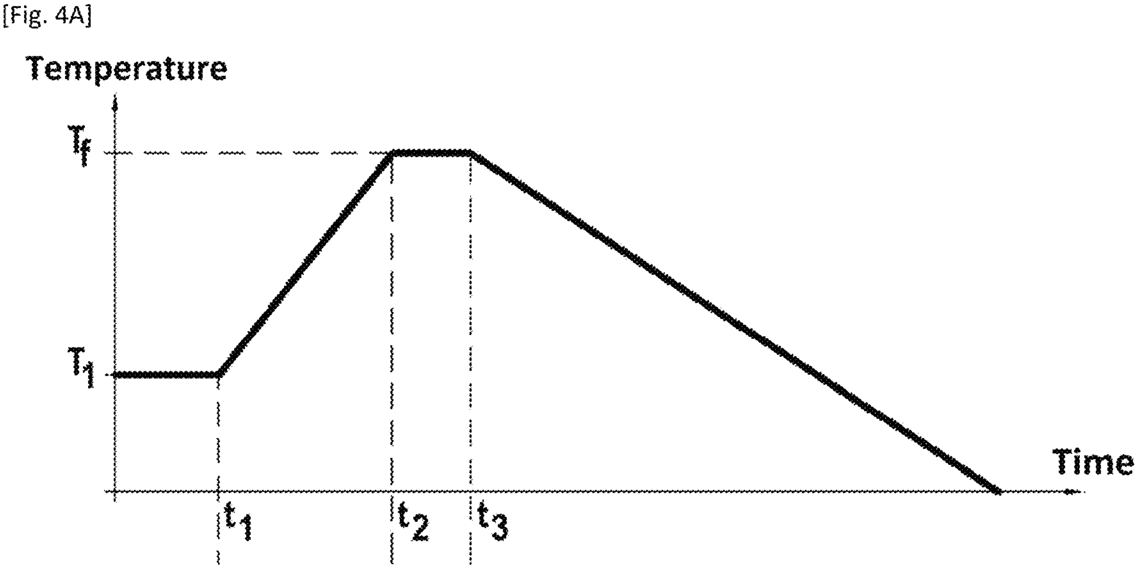
4A
[Fig. 4B]
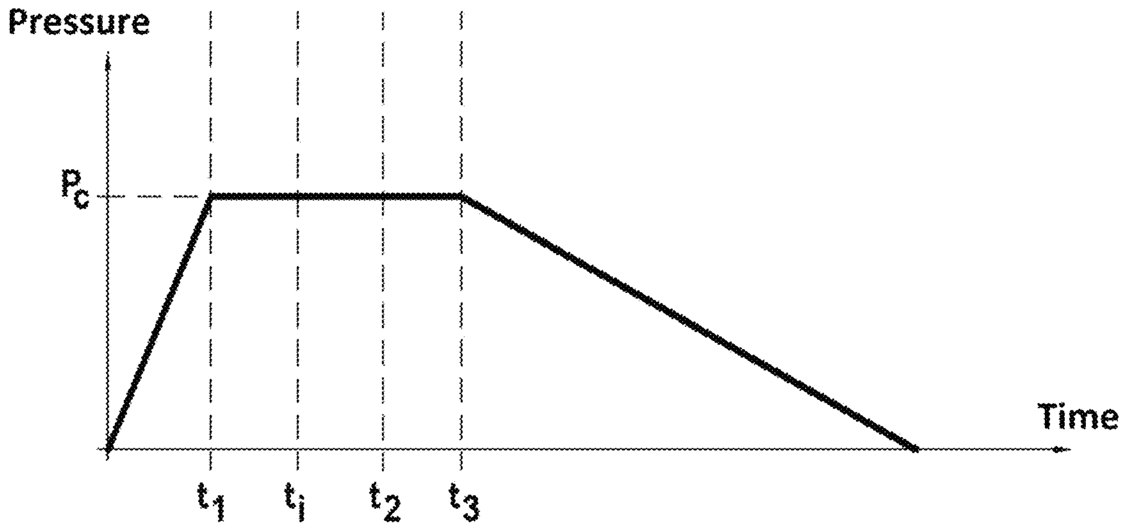
4B

[Fig. 5]
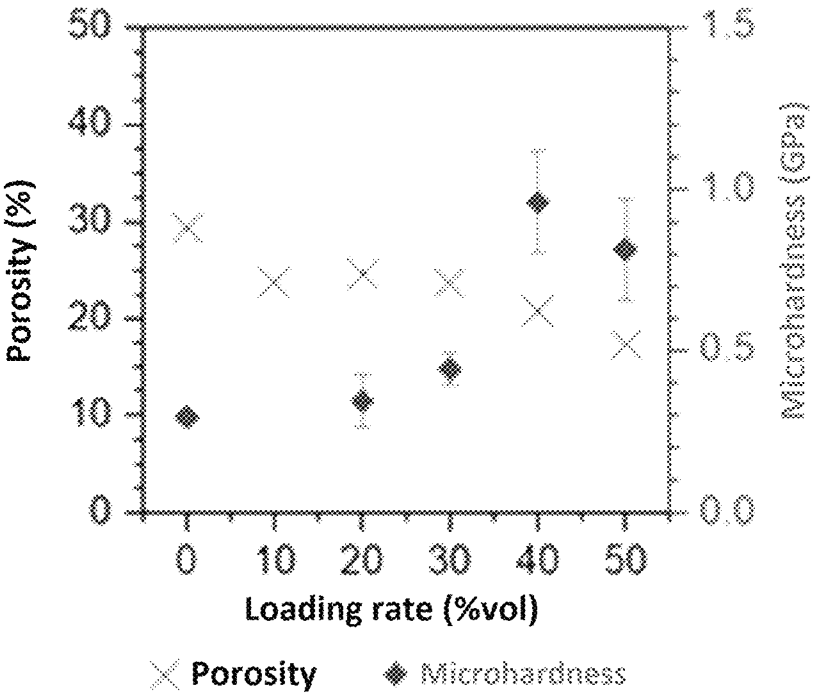
[Fig. 6]
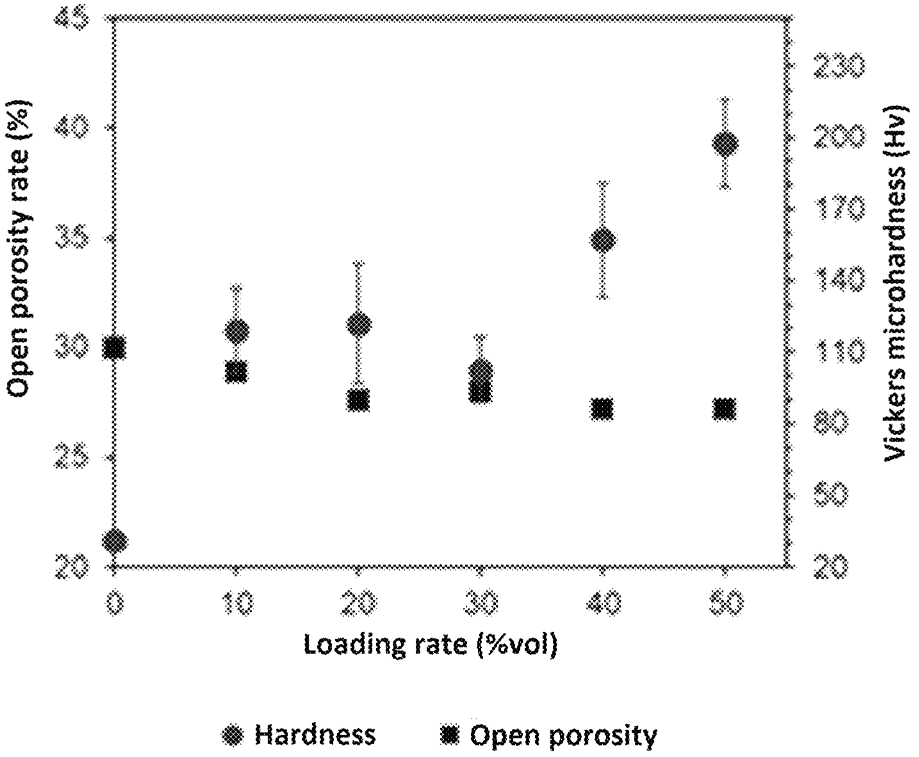

[Fig. 7]
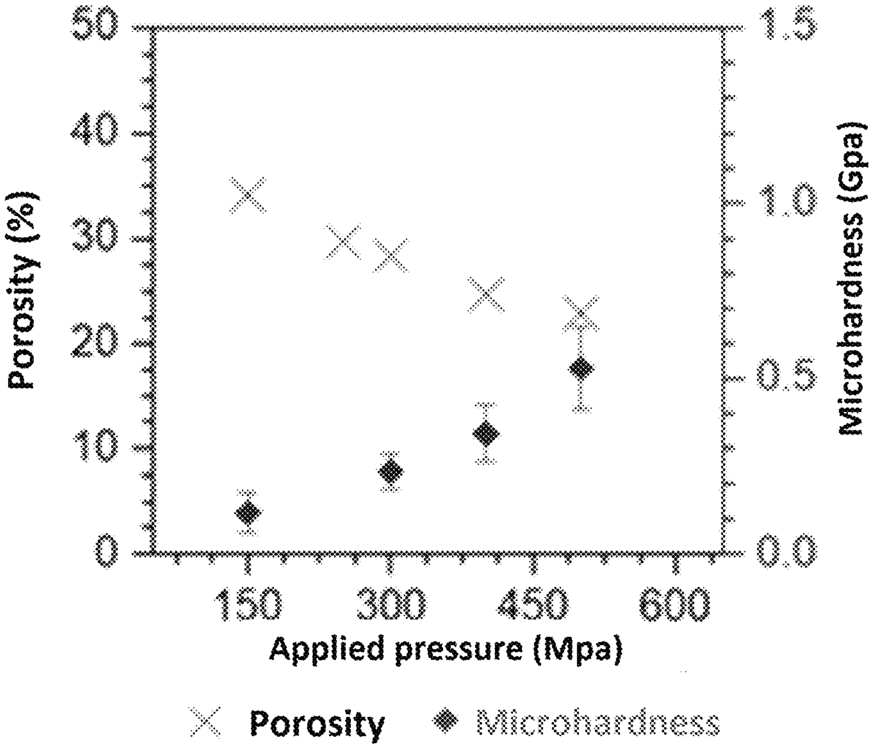
[Fig. 8]
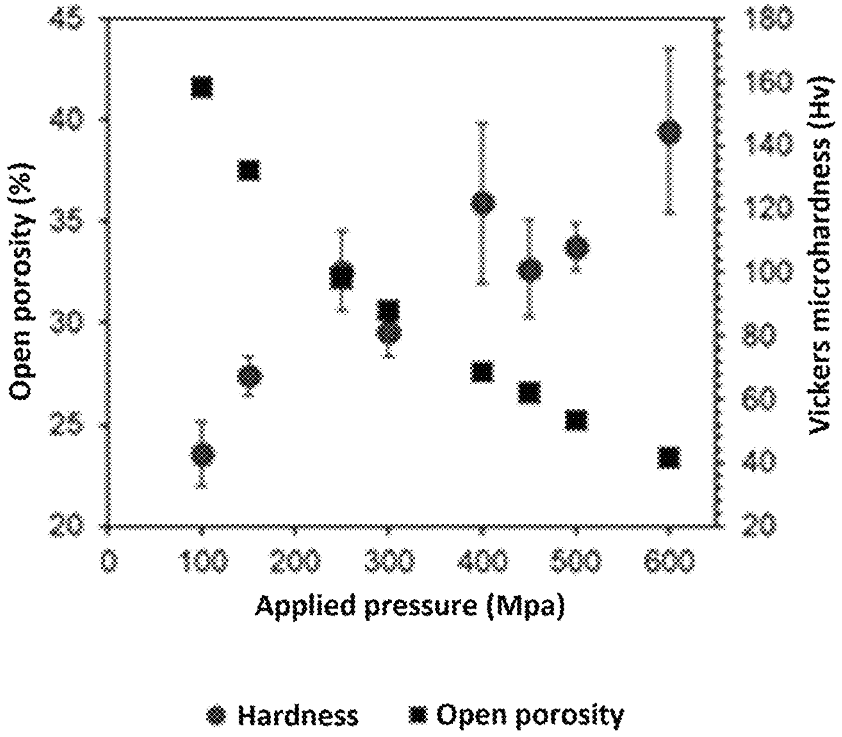

[Fig. 9]
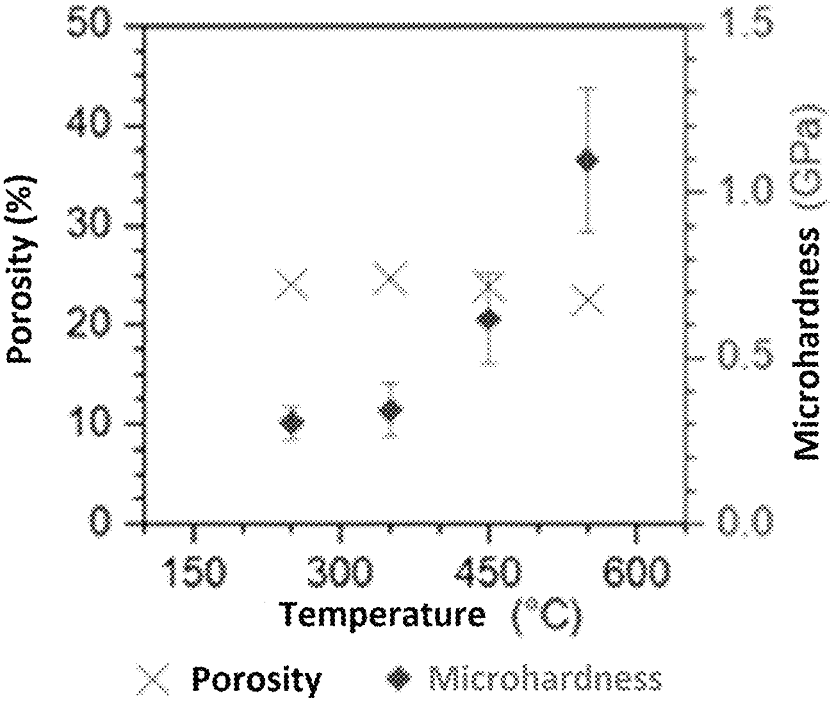

METHOD FOR PRODUCING AN ABRADABLE COATING, ABRADABLE COATING AND COATED PART

CROSS-REFERENCE TO RELATED APPLICATIONS

This is a National Stage Application under 35 U.S.C. § 371 of International Application No. PCT/FR2023/051325, filed Sep. 4, 2023, now published as WO 2024/056958 A1, which claims priority to French Patent Application No. 2209198, filed on Sep. 13, 2022, the entireties of which are incorporated herein by reference.

TECHNICAL FIELD

This disclosure relates to a method for producing an abradable layer and a substrate coated with this layer.

Such an abradable layer can in particular be used to equip a rotating machine ring in order to ensure the sealing of the machine at the top of the rotating blades for example. Such an abradable layer is particularly adapted for equipping turbine rings in the aeronautical field, and particularly in aircraft turbojets.

PRIOR ART

Abradable seals are currently used in gas turbines to minimize the functional clearance, and therefore leakage, between rotating portions (for example rotor blades) and static portions (for example ring sectors). In high-pressure turbines, the abradable seals are deposited on the ring sectors, forming a substrate, attached to the casing. When the turbine blades contact the abradable seal, the latter should wear out first, which would allow the aerodynamic performance of the engine to be maintained.

However, it is also preferable to protect the ring sectors from high temperatures, which can reach 1600° C., and from erosion by the flow of gas emerging at high temperature and pressure. With this in mind, a ceramic or refractory metal-based coating is usually formed by thermal spraying on the ring sectors, to form a thermal barrier type protective coating. However, the coatings thus obtained may not have very high abradability, which can lead to wear of the blade tips during operation, leading to complex and costly repairs.

In order to increase the abradability of thermal barriers, various solutions have been considered in the prior art. In this respect, mention can be made of the incorporation of porogenic agents in order to increase the porosity rate of the barrier. However, these solutions may not be entirely satisfactory because they can lead to significantly degrading the erosion resistance of the coating and therefore the service life of the barrier and the underlying substrate.

Another solution, presented in patent application FR 3 044 945, uses flash sintering, usually called Spark Plasma Sintering (SPS), in order to generate abradable coatings with property gradients, with in particular a lower porosity rate at the edges of the coating in order to better withstand erosion. However, although offering good results, this solution requires special preparation of the substrate. Generally speaking, this type of sintering involves temperatures above 1000° C. This is called solid-state sintering.

Yet another solution, presented in patent application FR 3 082 765, uses yttria-containing zirconia powders with different aspect ratios. However, this solution results in relatively high porosity rates, comprised between 30 and 50%, such that even higher erosion resistance is desired for certain particularly demanding applications. Moreover, this type of solution involves sintering the yttria-containing zirconia at temperatures above 1000° C.

There is therefore a need to provide an abradable layer and a method for producing this layer having both good abradability and good erosion resistance.

Disclosure of the Invention

The present disclosure relates to a method for producing an abradable ceramic composite coating on a substrate, the method comprising: obtaining a pulverulent composition in powder form comprising a matrix powder and a ceramic filler hydrated precursor powder, the loading rate of the mixture being comprised between 5 and 40%, compressing the obtained pulverulent composition at a pressure greater than 150 MPa, and a step of reactive sintering of the obtained pulverulent composition, during which the compression is maintained, at a temperature of less than 550° C., and the particles of the matrix powder in the sintered pulverulent composition have an aspect ratio of 2 or greater.

In this disclosure, the term "reactive sintering" refers to sintering in which the sintered material undergoes a chemical reaction. Typically, the sintered material may undergo dehydration.

In this disclosure, the aspect ratio is the number average value of the following ratio R calculated for each particle of a given set of particles, with R denoting the ratio [largest dimension of the particle]/[largest transverse dimension of the particle]. If the particle is a fiber, the aspect ratio can be calculated by the ratio [length of the fiber]/[diameter of the fiber].

It is understood that the aspect ratio is measured after compression of the pulverulent composition. The aspect ratio is measured from images of the abradable coating obtained by scanning electron microscope.

In this disclosure, the term "loading rate" is defined as the volume percentage of the ceramic filler precursor powder in its dehydrated form relative to the combined total volume of the matrix powder and the ceramic filler precursor powder in its dehydrated form. In other words, the ceramic filler hydrated powder is added to the mixture in such a way as to obtain a desired loading rate, calculated for a corresponding dehydrated ceramic filler. The hydration rate is taken into account in this calculation to determine the volume of ceramic filler precursor in its dehydrated form, taking into account the volume of the hydrated precursor. The hydration rate of the ceramic filler can be measured by thermogravimetric analysis, for example. Here, the loading rate is comprised between 5 and 40%.

In this disclosure, the ceramic filler precursor refers to the chemical species which, once sintered, transforms into ceramic filler.

In this disclosure, the term "hydrated precursor powder" refers to a powder comprising within it either chemisorbed water molecules (for example hydrates such as $LaPO_4 \times H_2O$) or hydroxyl groups (for example $Zr(OH)_4$).

The use of the pulverulent composition as previously described, as well as the use of a pressure sintering technique advantageously allows to obtain a layer having both good abradability and good resistance to erosion. Furthermore, the inventors have found that the abradable layers formed by reactive pressure sintering at a relatively low temperature (for example less than 500° C.) have better resistance to erosion compared to the layers formed by solid-state sintering at an equal porosity rate, or even, in certain cases, if the porosity rate is higher. This is then referred to as low-temperature sintering.

In this disclosure, the erosion of an abradable coating is evaluated according to ASTM G76 standard.

Moreover, the use of a ceramic filler hydrated precursor allows the ranges in which sintering parameters are acceptable to be expanded and a satisfactory abradable coating can be obtained. This latitude gained by the operator allows more room for the latter to optimize the abradable coating for a specific use.

In addition, the ceramic filler powder can fill some of the macroporosities obtained in the ceramic matrix at the end of the sintering step. This results in a lower porosity rate, which provides better resistance to erosion.

The present method also has advantages related to the low temperatures it involves, as opposed to the temperatures involved in known methods. Indeed, temperatures below 550° C. firstly allow to reduce the impact of differences in thermal expansion and the degradation of one component compared to another, for example. Therefore, this facilitates the development of potentially multi-layer coatings, and increases the chemical adhesion at the interfaces of such coatings. Secondly, the use of low temperatures has an intrinsic economic interest since it simplifies the implementation of the method while being up to ten times less energy-intensive than with the use of high temperatures.

In some embodiments, the sintering step comprises a temperature increase at a speed comprised between 10° C./min and 100° C./min, followed by a plateau during which the temperature is kept constant for 1 to 30 minutes.

In this configuration, the reactivity of the hydrated precursor is optimized.

In some embodiments, the ceramic filler hydrated precursor powder comprises hydrated lanthanum phosphate and/or zirconium hydroxide.

In some embodiments, the matrix powder comprises yttria-stabilized zirconia.

The use of yttria-stabilized zirconia (or YSZ) has a double advantage. Indeed, it has good chemical stability at high temperatures and low thermal conduction, which makes YSZ relevant for use as a thermal barrier. On the other hand, YSZ has good mechanical properties and in particular good resistance to erosion.

In some embodiments, the loading rate is comprised between 10% and 35%.

Such a loading rate allows, in the case of a lanthanum precursor, to fill the porosity of the matrix while limiting the percolation of the latter, which could increase the microhardness of the final coating unduly. Moreover, in the case of a zirconium precursor, such a loading rate allows to limit the appearance of possible solid inclusions of the load in the matrix.

In some embodiments, the compression of the pulverulent composition is done at a pressure comprised between 200 and 400 MPa.

This pressure range ensures satisfactory sintering at low temperature while limiting the breakage of the matrix fibers.

In some embodiments, the ceramic filler hydrated precursor comprises hydrated lanthanum phosphate and wherein the sintering temperature is less than 500° C.

Such a sintering temperature allows to limit the crystallization of $LaPO_4 \times H_2O$ into anhydrous $LaPO_4$, which gives better properties to the coating obtained.

In some embodiments, the ceramic filler hydrated precursor comprises zirconium hydroxide and wherein the sintering temperature is less than 400° C.

Such a temperature allows to limit the rapid crystallization of $ZrO_2$, which gives better properties to the coating obtained.

In some embodiments, obtaining the pulverulent composition comprises mixing the matrix powder and the ceramic filler hydrated precursor powder by dry means, preferably for at least one hour.

In some embodiments, the pulverulent composition undergoes grinding to homogenize the distribution of fiber sizes contained in the ceramic matrix powder.

In some embodiments, the sintering step is performed by flash sintering.

In this configuration, the microstructure of the obtained abradable can be controlled more precisely.

The present disclosure moreover relates to an abradable ceramic coating obtained according to the method of one of the preceding aspects, the coating having a volumetric rate of open porosity comprised between 10% and 40%, preferably between 15% and 30%, and a Vickers microhardness comprised between 0.1 and 3 GPa. In certain configurations, the volumetric rate of open porosity may be comprised between 20% and 40%, preferably between 25% and 30%.

In this disclosure, porosity is measured according to ISO 5017:2013 standard.

In some embodiments, the abradable ceramic coating comprises a matrix and ceramic fillers having a lamellar or pyrochlore crystallographic structure.

The present disclosure also relates to a superalloy part for a turbomachine, for example a turbine, comprising a coating according to the preceding aspect. The substrate, such as a ring sector, may be made of nickel alloy.

The above-mentioned features and advantages, as well as others, will become apparent from the following detailed description of exemplary embodiments of the proposed device and method. This detailed description refers to the appended drawings.

BRIEF DESCRIPTION OF THE DRAWINGS

The appended drawings are schematic and are intended primarily to illustrate the principles of the disclosure.

FIG. 1 schematically illustrates, in section and in perspective, a portion of a stator ring according to one embodiment of the invention.

FIG. 2A-2B FIGS. 2A and 2B schematically illustrate the implementation of an exemplary method according to one embodiment of the invention.

FIG. 3 schematically illustrates a method according to the embodiment of the invention.

FIG. 4A-4B FIGS. 4A-4B represent an example of the evolution of the compression pressure and the temperature during the production of the abradable layer according to the method of the embodiment of the invention.

FIG. 5 shows the evolution of porosity and microhardness as a function of the loading rate, for a $YSZ/LaPO_4$ composite coating produced at a sintering temperature of 350° C.

FIG. 6 shows the evolution of porosity and microhardness as a function of the loading rate, for a $YSZ/Zr(OH)_4$ composite coating produced at a sintering temperature of 350° C.

FIG. 7 shows the evolution of porosity and microhardness as a function of the pressure applied during sintering, for a $YSZ/LaPO_4$ composite coating produced at a sintering temperature of 350° C.

FIG. 8 shows the evolution of porosity and microhardness as a function of the pressure applied during sintering, for a $YSZ/Zr(OH)_4$ composite coating produced at a sintering temperature of 350° C.

FIG. 9 shows the evolution of porosity and microhardness as a function of the maximum sintering temperature, for a YSZ/$LaPO_4$ composite coating.

DESCRIPTION OF THE EMBODIMENTS

In order to make the disclosure more concrete, an example of a method is described in detail below, with reference to the appended drawings. It is recalled that the invention is not limited to this example.

FIG. 1 schematically illustrates a stator ring, which is divided into several sectors each comprising a substrate 10 coated with an abradable layer 12.

An exemplary embodiment of the abradable layer 12 will be described in connection with FIGS. 2A, 2B and 3. FIGS. 2A and 2B schematically illustrate the embodiment of an exemplary method according to the invention, while FIG. 3 schematically illustrates the progress of this method.

The method comprises obtaining E1 a pulverulent composition 30 and a reactive sintering step E2 of the prepared pulverulent composition 30.

The substrate 10 to be coated is disposed in the cavity of a mold 20. The pulverulent composition 30 is then deposited on a surface S of the substrate 10. As shown in FIG. 2B, the mold 20 is then closed, for example by a cover 25. A bearing face of its cover 25 is applied against the layer of pulverulent composition 30 so as to compress the latter on the substrate 10. The compression pressure applied to the pulverulent composition 30 may be a uniaxial pressure. The thickness of the layer of pulverulent composition 30 is thus reduced due to the compression between the substrate 10 and the cover 25: the pulverulent composition 30 is compacted. The pulverulent composition 30 undergoing the compression is then sintered. For example, a flash sintering technique ("SPS") can be used to produce the abradable layer 12. The abradable layer 12 is obtained at the end of this sintering step E2.

In the illustrated example, the abradable layer 12 obtained has a substantially uniform density. Alternatively, abradable layers with variable density could be formed, for example by following the principles described in patent application FR 3 044 945.

In the present example, it is described that the abradable layer 12 is directly formed on the substrate 10 from the pulverulent composition 30 previously deposited on the substrate 10. In a variant not illustrated, the abradable layer 12 can first be formed on a support separate from the substrate 10 by implementing the pressure sintering method that was described above. According to this variant, the abradable layer 12 thus formed is then separated from the support to be positioned on the surface S of the substrate 10. This abradable layer 12 thus positioned is then secured to the surface S of the substrate 10 in order to obtain the coated substrate. This securing can be carried out by brazing, sintering or using added elements (bolting for example).

The abradable layer 12 formed is particularly suitable for equipping high or low pressure turbine rings or compressor rings, for example in the aeronautical field, and particularly in aircraft turbojets.

Various details relating to the substrate 10, to the pulverulent composition 30 and to the operating parameters which may be imposed during the method will now be described.

The substrate 10 may be made of a metallic material, for example a superalloy. When the substrate 10 is made of a metallic material, the latter may for example be formed by one of the following commercial materials: "AM1" alloy, "C263" alloy or "M509" alloy (the trademarks in quotation marks being registered).

Alternatively, the substrate 10 may be made of ceramic matrix composite (CMC) material. In this case, the substrate 10 may include a woven fibrous reinforcement, formed of carbon or silicon carbide fibers, densified by a ceramic matrix, comprising for example silicon carbide.

To improve the adhesion of the abradable layer 12 to the substrate 10, the substrate 10 may be coated with a bonding layer (not shown) that the abradable layer 12 is intended to coat. In the case of a metal substrate 10, it is possible, for example, to use an MCrAlY bonding layer, for example a CoNiCrAlY bonding layer. In the case of a CMC substrate, it is possible to use a mullite bonding layer, for example.

Regarding the pulverulent composition 30, it comprises ceramic particles and an inorganic filler.

In the present embodiment, the ceramic particles, forming a powder, are made of yttria zirconia (YSZ). This powder is intended, after sintering, to form the matrix of the coating, which is why it is referred to as a ceramic matrix powder. Other examples of ceramic powder can be used, for example zirconias co-doped with a transition metal or a lanthanide (dysprosium, scandium, hafnium, tantalum, lanthanum, etc.).

In other examples, these particles are fibrous: they then have variable aspect ratios, comprised between 2 and 30, preferably between 2 and 25.

The fibrous particles may have an average diameter in the non-agglomerated state (or average width) of 6 μm or greater, for example comprised between 6 μm and 8 μm. The fibrous particles may have an average length of 15 μm or greater, for example comprised between 15 μm and 300 μm, it being understood that the average aspect ratio of the fibrous particles remains of 2 or greater.

The fibrous particles usable in the context of the disclosure may correspond to those described in patent application FR 3 082 765.

The hydrated precursor of inorganic filler is typically a powder of hydrated lanthanum phosphate $LaPO_4 \times H_2O$ capable of forming, once sintered, an anhydrous lanthanum phosphate filler $LaPO_4$ of lamellar structure or a zirconium hydroxide $Zr(OH)_4$ powder capable of forming a zirconium oxide $ZrO_2$ filler. Such powders are known in themselves and generally marketed directly in a hydrated phase, for example by the companies Alfa-Aesar® or Merck®.

Subsequently, the method for producing the abradable coating is described by taking the example of lanthanum phosphate as an inorganic filler. However, this description applies mutatis mutandis to any other hydrated inorganic filler, in particular to zirconium hydroxide. Other hydrated precursors can be considered as hydrates or precursors comprising hydroxyl groups. Among the hydrates, the following can be considered: hydrated phosphate, hydrated carbonate or hydrated sulfate.

The pulverulent composition 30 is then obtained by mixing the ceramic powder with this hydrated inorganic powder. The inorganic powder loading rate in the pulverulent composition 30 can theoretically be comprised between 1 and 75%; however, the best results are obtained for a volume content of inorganic powder comprised between 10 and 40%. This is supported by the comparative tests discussed below.

The pulverulent composition 30 then undergoes a dry mixing step using a three-dimensional dynamic mixer, for example a mixer marketed under the brand Turbula by the company WAB. The duration of this mixing step can be comprised between 5 minutes and 4 hours, for example between 30 minutes and 2 hours.

Various details relating to the substrate 10 and to the pulverulent composition 30 have just been described. Details relating to the abradable layer 12 that can be obtained as well as to the operating conditions that can be implemented will now be described.

Changing the temperature imposed during sintering, the duration of sintering and/or the compression pressure applied allows to vary the volume porosity rate of the abradable layer 12 obtained. Generally speaking, increasing the temperature, the duration of sintering and/or the compression pressure thus allows to reduce the volume porosity rate of the abradable layer 12. Thus, the volume porosity rate of the abradable layer 12 may be comprised between 5% and 50%, for example between 15% and 40%, for example between 25% and 35% or even between 25% and 30%.

FIGS. 4A-4B show a possible example of the evolution of the compression pressure and the temperature during the production of the abradable layer 12.

The assembly of the substrate 10 and the pulverulent composition 30 is initially brought to a first temperature T1, for example comprised between 25 and 50° C. While the assembly is brought to this first temperature T1, the compression pressure increases until reaching, at a first time t1, a plateau at a value Pc which corresponds to the compression pressure which will be applied during the sintering of the pulverulent composition 30.

The compression pressure Pc imposed on the pulverulent composition 30 during sintering may be comprised between 150 and 600 MPa, for example between 150 MPa and 400 MPa or between 250 MPa and 500 MPa. The compression pressure Pc is maintained throughout the sintering of the pulverulent composition 30.

From the first instant t1 the temperature imposed on the substrate 10 and on the pulverulent composition 30 is increased to the sintering temperature Tf. The temperature reaches the sintering temperature Tf at a second instant t2 and is then maintained at this value. The sintering temperature Tf depends on the nature of the pulverulent composition 30 used. This sintering temperature Tf can be comprised between 150° C. and 550° C., for example between 100° C. and 300° C.

The sintering temperature Tf and the compression pressure Pc are maintained until the third instant t3. The sintering duration (t3−t2) may be of 1 minute or greater, for example between 1 and 30 minutes. Once the sintering is complete, the compression pressure and the temperature are gradually reduced and the substrate 10 coated with the abradable layer 12 is then recovered and/or created.

In the illustrated example, a first temperature rise speed is imposed up to the sintering temperature Tf. For illustration purposes, the first temperature rise speed may be of 10° C./minute or greater. The temperature rise speed may be constant or variable.

As a non-limiting example, sintering can be carried out by flash sintering with a compression pressure Pc o 400 MPa, a sintering temperature Tf of 350° C., and a duration of 10 minutes.

Comparative Tests—YSZ/$LaPO_4$

FIG. 5 shows the evolution of porosity and microhardness as a function of the loading rate, for a YSZ/$LaPO_4$ composite coating produced at a sintering temperature of 350° C.

In general, it is observed that the porosity decreases in a substantially linear manner when the loading rate increases. Moreover, for a loading rate comprised between 5 and 40%, it is observed that the porosity is comprised between 20 and 30%.

In general, it is observed that the microhardness increases when the loading rate increases. A more pronounced increase is noted for a loading rate greater than 30%. Indeed, in the area where the loading rate is less than 30%, the filler only partially fills the macroporosity generated by the matrix. The microhardness of the abradable is then close to the microhardness of the matrix. For a loading rate greater than 30%, the filler particles percolate into the porous network of the matrix, which significantly increases the microhardness. As a result, the resistance to erosion increases.

FIG. 7 shows the evolution of porosity and microhardness as a function of the pressure applied during sintering, for a YSZ/$LaPO_4$ composite coating at 20% loading rate produced at a sintering temperature of 350° C.

In general, it is observed that porosity decreases when pressure increases. Conversely, microhardness increases when pressure increases. These changes are explained by a particulate rearrangement of the filler particles to form denser networks when pressure increases.

Comparative Tests—YSZ/$ZrOH_4$

FIG. 6 shows the evolution of porosity and microhardness as a function of the loading rate, for a YSZ/$Zr(OH)_4$ composite coating produced at a sintering temperature of 350° C.

In general, it is observed that the porosity decreases in a substantially linear manner when the loading rate increases. Moreover, for a loading rate comprised between 5 and 40%, it is observed that the porosity is comprised between 20 and 25%.

In general, it is observed that the microhardness increases when the loading rate increases. A more pronounced increase is noted for a loading rate comprised between 5% and 10%. Indeed, in this area, the filler partially fills the macroporosity generated by the matrix, which significantly increases the microhardness. As a result, the resistance to erosion increases. In other words, the microhardness of the composite is close to the microhardness of the matrix. For a loading rate greater than 10% (and less than 50%), the filler agglomerates form solid inclusions in the matrix that limit the porosity filling effect. As a result, the increase in Vickers microhardness is less marked, and can even decrease.

FIG. 8 shows the evolution of porosity and microhardness as a function of the pressure applied during sintering, for a YSZ/$Zr(OH)_4$ composite coating at 20% loading rate produced at a sintering temperature of 350° C.

In general, it is observed that porosity decreases when pressure increases. Conversely, microhardness increases when pressure increases. These changes are explained by a particulate rearrangement of the filler particles to form denser networks when pressure increases.

FIG. 9 shows the evolution of porosity and microhardness as a function of the sintering plateau temperature, for a YSZ/$Zr(OH)_4$ composite coating at 20% loading rate produced at a pressure of 400 MPa.

In general, it is observed that the porosity is relatively little dependent on the sintering temperature. Conversely, it is observed that the microhardness increases when the sintering temperature increases, and increases sharply above 350° C. This behavior above 350° C. is due to the crystallization of monoclinic zirconium oxide from amorphous zirconium hydroxide.

Without being bound by theoretical conditions, the inventors identified three areas delimited by the maximum temperature undergone by the pulverulent composition during the sintering step, hereinafter called the sintering temperature.

a. For a sintering temperature of less than 250° C., a small portion of zirconium hydroxide gradually dehydrates. The abradable layer formed then comprises a matrix and a partially hydrated amorphous filler. Such an abradable layer has a low microhardness.

b. At a sintering temperature comprised between 250° C. and 400° C., a large portion of the amorphous filler $Zr(OH)_4$ crystallizes into the harder monoclinic oxide $ZrO_2$. Consequently, the microhardness increases.

c. For a sintering temperature above 400° C., all the amorphous ceramic filler precursor $Zr(OH)_4$ is transformed very quickly into a monoclinic phase $ZrO_2$. A mesoporosity then appears. The appearance of this mesoporosity leads to a slight decrease in the Vickers microhardness despite the crystallization of the ceramic filler $ZrO_2$.

Other tests show that the abradable layers obtained by the method allow to obtain, during an abradability test, almost zero wear of blades placed opposite such abradable layers. Moreover, the erosion resistance of the abradable layers obtained by the method of the invention is better compared to known abradable layers. Indeed, the abradable layers obtained by the method of the invention have an erosion resistance up to 60 times greater than the known abradable layers.

In these present examples it appears that the loading rate and the sintering parameters can be optimized in order to lower the porosity rates, while maintaining coatings whose microhardness is comprised between 0.1 and 3 GPa. In such a situation, the abradability and the erosion resistance of the coating obtained is improved.

Although the present invention has been described with reference to specific exemplary embodiments, it is obvious that modifications and changes may be made to these examples without departing from the general scope of the invention as defined by the claims. In particular, the description and drawings are to be considered in an illustrative rather than restrictive sense.

It is also obvious that all the features described with reference to a method are transposable, alone or in combination, to a device, and conversely, all the features described with reference to a device are transposable, alone or in combination, to a method.

The invention claimed is:

1. A method for producing an abradable ceramic composite coating on a substrate, the method comprising:

obtaining a pulverulent composition comprising a matrix powder comprising a zirconia co-doped with a transition metal or a lanthanide, and a ceramic filler hydrated precursor powder comprising a hydrate or a hydroxyl group, the pulverulent composition having a loading rate of the mixture being comprised between 5 and 40% in volume, compressing the obtained pulverulent composition at a pressure greater than 150 MPa, and a step of reactive sintering of the obtained pulverulent composition, during which the compression is maintained, at a temperature of less than 550° C., and the particles of the matrix powder in the sintered pulverulent composition have an aspect ratio of 2 or greater.

2. The method according to claim 1, wherein the sintering step comprises a temperature increase at a speed comprised between 10° C./min and 100° C./min, followed by a plateau during which the temperature is kept constant for 1 to 30 minutes.

3. The method according to claim 1, wherein the ceramic filler hydrated precursor powder comprises hydrated lanthanum phosphate and/or zirconium hydroxide.

4. The method according to claim 1, wherein the matrix powder comprises yttria-stabilized zirconia.

5. The method according to claim 1, wherein the pulverulent composition having a loading rate comprised between 10% and 35% in volume.

6. The method according to, claim 1, wherein the compression of the pulverulent composition is done at a pressure comprised between 200 and 400 MPa.

7. The method according to claim 1, wherein the ceramic filler hydrated precursor comprises hydrated lanthanum phosphate and wherein the sintering temperature is less than 500° C.

8. The method according to claim 1, wherein the ceramic filler hydrated precursor comprises zirconium hydroxide and wherein the sintering temperature is less than 400° C.

9. The method according claim 1, wherein obtaining the pulverulent composition comprises mixing the matrix powder and the ceramic filler powder by dry means.

10. The method according to claim 1, wherein obtaining a pulverulent composition comprises mixing the matrix powder and the ceramic filler powder by dry means for at least one hour.

11. The method according to claim 1, wherein the reactive sintering step is carried out by flash sintering.

12. An abradable ceramic coating obtained according to the method of claim 1, the coating having a volumetric rate of open porosity comprised between 10% and 40%, and a Vickers microhardness comprised between 0.1 and 3 GPa.

13. An abradable ceramic coating according to claim 1, wherein the coating has a volumetric rate of open porosity comprised between 15% and 30%, and a Vickers microhardness comprised between 0.1 and 3 GPa.

14. A superalloy part for a turbomachine, for example a turbine, comprising a coating according to claim 12.

* * * * *